Figure 1:
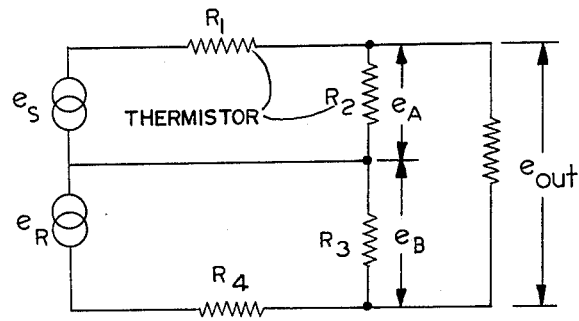

March 1, 1966  R. J. RECHTER  3,238,464
TEMPERATURE COMPENSATION OF A SATURATING TRANSFORMER BY USE
OF A SATURATING TRANSFORMER-DERIVED REFERENCE SUPPLY
Filed July 9, 1962

INVENTOR
ROBERT J. RECHTER

BY Stevens, Davis, Miller & Mosher

ATTORNEYS

United States Patent Office 3,238,464
Patented Mar. 1, 1966

3,238,464
TEMPERATURE COMPENSATION OF A SATURATING TRANSFORMER BY USE OF A SATURATING TRANSFORMER-DERIVED REFERENCE SUPPLY
Robert J. Rechter, Miami Beach, Fla., assignor to Airpax Electronics Incorporated, Fort Lauderdale, Fla., a corporation of Maryland
Filed July 9, 1962, Ser. No. 208,428
6 Claims. (Cl. 329—140)

The invention relates to the temperature compensation of a saturating transformer using a saturating transformer-derived reference supply, and has more particular use to such circuit arrangement for use in telemetry discriminators.

More particularly, the invention is directed to a zero suppressed frequency discriminator circuit that utilizes a saturating transformer to achieve a pulse averaging action. The temperature dependence of saturating transformer core material in both a signal and a reference circuit is arranged so as to effectively achieve over-all output stability with ambient temperatures. The temperature gradient is minimized in accordance with the present invention by placing the signal circuit and the reference circuit in a common can or receptacle, in which the can or receptacle is filled with a good heat transfer material, such as silicone oil, and the like. The cores are selected so that they are identical in type and material as well as the characteristic features of tape thicknesses, bobbin materials, and alloy compositions.

There are certain existing methods and apparatus that are used in an attempt to compensate for changes in the saturating transformer, its rectifier diodes, and the temperature changes in the low-pass filter, which uses often include a thermistor or a positive temperature coefficient resistor network, or both the thermistor and the above resistor network. It has been found that these methods are subject to certain disadvantages at least some of which are (1) that the temperature dependence of the transformer core material, the saturation flux density, and the rectifier diode junction drop is not substantially linear over a reasonable temperature range; (2) that thermistors exhibit hysteresis-type characteristics and are not particularly stable over the long term; (3) that thermistors are not linear temperature coefficient elements and, at best, provide only a 3-point compensation; and (4) that the use of thermistor or positive temperature resistor networks involves modifying the impedances of the saturating transformer circuit.

An object of the present invention is to provide a non-linear temperature dependence of the transformer core and its rectifier diodes to occur in both the signal and the reference voltage circuits. The reference or null voltage for zero suppression is also derived from a saturating transformer which is wound on the same type of core material as the signal transformer.

It is an object of the present invention, therefore, to provide signal and reference voltages which decrease non-linearly with increasing temperature, but in opposite directions so as to oppose equally any net changes in the summed output.

A further object of the present invention is to provide temperature compensation which is a point-by-point compensation with improved tracking through the expected operating range of 0° to 65° C.

Figure 2:
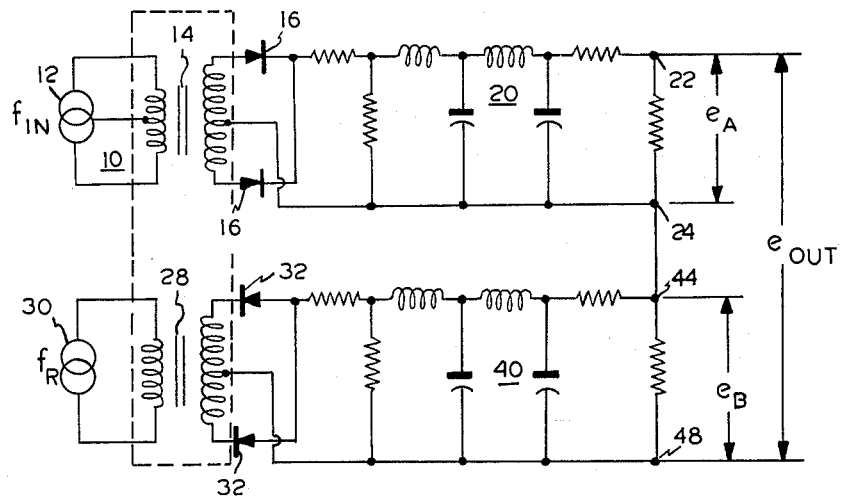

The above and other objects and advantages of the invention will become apparent upon full consideration of the following detailed description and accompanying drawings in which:

FIG. 1 is a schematic equivalent circuit diagram of a general discriminator circuit of the prior art and using thermistor-resistor networks; and FIG. 2 is a circuit diagram of a temperature compensation arrangement for a saturating transformer using saturating transformer-derived reference supply in accordance with the preferred embodiment of the present invention.

Referring now to FIG. 1, there is shown a schematic of an equivalent circuit having the output of a signal saturating transformer producing a voltage $e_s$, the output of a reference transformer producing a voltage $e_R$, and an output voltage $e_{out}=e_A-e_B$, where $e_A=e_B$ at the null input frequency, and represent the voltage drop across resistors $R_2$ and $R_3$, respectively.

Resistors $R_1$ and $R_2$ represent thermistor-resistor networks to achieve compensation of temperature changes, and resistors $R_3$ and $R_4$ are filter units matching the network $R_1$ and $R_2$. There are low-pass filtering components and rectifying diodes that are arranged in circuit between the voltage outputs $e_s$ and $e_R$, and the terminating resistive components $R_2$, $R_4$.

FIG. 2 shows a signal input circuit 10 which includes an alternating current source 12 having a frequency of $f_{in}$ which may be any signal frequency. The current source 12 is connected to a saturating transformer 14 having a primary connected to the input circuit 10 and a secondary connected to rectifying diodes 16, 16. A filter 20 is connected to the rectifiers so that an output is provided at terminals 22, 24 that is of a given polarity such as positive, as shown, due to the polarity of the rectifiers 16, 16.

A reference input 30 is applied to the primary of a saturating transformer 28 and operates at a reference frequency $f_R$. A secondary of the transformer 28 is connected to rectifiers 32, 32. The rectifiers 32, 32 are connected through a filter 40 to present a voltage of opposite polarity at terminals 44, 48 compared with the polarity at terminals 22, 24. The filter network 20, 40 comprises a low-pass band filter. The output is derived from terminals 22, 48 and is an average which is a summation of the opposite polarities of the reference and signal voltages. The output null at a center input frequency can be achieved if the average output is summed with the opposing polarity reference voltage. Frequency discrimination thereby occurs in the circuit, and the output is proportional to frequency differences in the signal input and the reference input.

The saturating transformers are wound on a rectangular hysteresis loop core material of the same type, and the pulse output is standardized as a result of using this type of material in each of the transformers 14, 28. Transformers 14, 28 have a common type of core material of a rectangular B-H loop nature. The average output of the transformers after pulse rectification by rectifiers 16, 32 and integration by the filters 20, 40 is linearly proportional to the input frequencies of the respective circuits. By use of common types of material in each of the saturating transformers 14, 28 and connecting the outputs of the respective filters 20, 40 in opposing relationships, the temperature dependance of the saturating transformer core materials is effectively cancelled out so as to effectively achieve over-all output stability with ambient temperatures. In a preferred embodiment of the invention the transformers 14, 28 may be mounted in a can or receptacle so that both transformers are subjected to common ambient temperatures. The can are filled with a good heat transfer potting material such as silicone oil, and the like.

It is within the scope of the invention to arrange any plurality of saturating transformers in pairs so that the secondaries are connected, via the rectifier and filter networks, to effect a net elimination of voltage variation resulting from temperature changes in the transformer and rectifier components.

The reference voltage may be derived from a constant frequency source which has a negligible temperature coefficient. The reference can therefore be assumed to be in variance with temperature.

The saturation flux density of the saturating transformer core decreases with increasing ambient temperature. By providing a nulled output in accordance with the present invention, there is provided a tendency to decrease the magnitude of the output with increasing temperature. These parameter changes need not be of a linear nature due to the nulling process.

This method of temperature compensation is essentially one of zero compensation, since gain changes over the usual range of deviation about the center or null frequency are small in magnitude.

It will thus be apparent that the new circuit apparatus has an order of magnitude in improvement over the prior art thermistor-resistor circuit compensation devices, since the temperature gradients between the signal and the reference saturating transformers are correspondingly the same and the characteristics of the saturating transformer core material are correspondingly the same, while the voltages as rectified and filtered are applied in opposing relationship at the output terminals 22, 48.

Practicability of the invention depends upon the stability and low cost of the signal frequency saturating transformer, the reference frequency saturating transformer, associated filter networks, and the reference frequency source. The frequency source may typically be a crystal oscillator with power amplifier output.

It should be understood that the specific apparatus herein illustrated and described is intended to be representative only, as changes may be made therein without departing from the clear teachings of the invention. Accordingly, reference should be made to the following claims in determining the full scope of the invention.

What is claimed is:

1. A temperature compensation arrangement for signal and reference comparison circuits comprising a first saturating transformer having an input signal winding for receiving an input signal voltage ($f_{in}$) and having a secondary winding, a reference saturating transformer having a primary winding for receiving a reference voltage of constant frequency ($f_R$) and having a secondary winding, rectifier and filter network means connected to each of said secondary windings for producing solely from the respective input signal winding and the primary winding a full wave rectified and filtered output voltage thereof, said saturating transformers having a common type of core material so that changes in the signal and reference voltages occur non-linearly with varying temperatures, and coupling means for the outputs of the rectifier and filter network means connecting said outputs in opposition to each other so that temperature changes effect voltage variations in opposite directions so as to oppose net changes in summed output.

2. The invention of claim 1 having a common container for said saturating transformers so as to promote a common temperature environment and thermal time constant.

3. The invention of claim 1 in which said saturating transformers have a common type of core material of a rectangular B-H loop nature.

4. The invention of claim 1 having rectifier elements of said rectifier and filter means, such that the temperature characteristics thereof cooperate with the temperature characteristics of the core material so that ambient temperature changes are compensated.

5. The invention of claim 1, including said core material constructed and arranged to produce identical magnetic transfer functions using the same core material to null out parameter changes due to ambient temperature changes.

6. A temperature compensation arrangement for comparison circuits comprising a plurality of saturating transformers each having primary and secondary windings, said saturating transformers having a common type of core material, and a heat transfer material for surrounding the transformers therein, including said core materials, mutually exclusive means rectifying and filtering the signals of said primary windings, and means for coupling pairs of the secondary windings in opposition to each other so that temperature changes that effect voltage variations are in opposite directions to each other in said coupling pairs to eliminate any net changes in the summed output.

References Cited by the Examiner
UNITED STATES PATENTS

| 1,169,676 | 1/1916 | Pichon et al. | 336—60 X |
| 2,727,999 | 12/1955 | Rusler. | |
| 2,926,311 | 2/1960 | Gabor | 329—136 X |

NATHAN KAUFMAN, *Acting Primary Examiner.*

ALFRED L. BRODY, ROY LAKE, *Examiners.*